(12) United States Patent
Smyth et al.

(10) Patent No.: US 12,027,156 B2
(45) Date of Patent: Jul. 2, 2024

(54) NOISE ROBUST REPRESENTATIONS FOR KEYWORD SPOTTING SYSTEMS

(71) Applicant: Cypress Semiconductor Corporation, San Jose, CA (US)

(72) Inventors: Aidan Smyth, Meath (IE); Ashutosh Pandey, Irvine, CA (US); Avik Santra, Munich (DE)

(73) Assignee: Cypress Semiconductor Corporation, San Jose, CA (US)

( * ) Notice: Subject to any disclaimer, the term of this patent is extended or adjusted under 35 U.S.C. 154(b) by 304 days.

(21) Appl. No.: 17/677,921

(22) Filed: Feb. 22, 2022

(65) Prior Publication Data

US 2023/0104431 A1    Apr. 6, 2023

Related U.S. Application Data

(60) Provisional application No. 63/252,920, filed on Oct. 6, 2021.

(51) Int. Cl.
*G10L 15/10* (2006.01)
*G10L 15/04* (2013.01)
(Continued)

(52) U.S. Cl.
CPC .............. *G10L 15/10* (2013.01); *G10L 15/04* (2013.01); *G10L 15/063* (2013.01); *G10L 15/22* (2013.01);
(Continued)

(58) Field of Classification Search
CPC ....... G10L 15/10; G10L 15/04; G10L 15/063; G10L 15/22; G10L 25/18; G10L 2015/088; G10L 2015/223
See application file for complete search history.

(56) References Cited

U.S. PATENT DOCUMENTS

2019/0035390 A1*  1/2019  Howard ................. G10L 15/30
2021/0338103 A1*  11/2021  Imran ................... A61B 5/7267

OTHER PUBLICATIONS

Jose et al., "Accurate Detection of Wake Word Start and End Using a CNN", arXiv preprint arXiv:2008.03790, pp. 5 (2020).

(Continued)

*Primary Examiner* — Bhavesh M Mehta
*Assistant Examiner* — Darioush Agahi

(57) ABSTRACT

Described are techniques for noise-robust and speaker-independent keyword spotting (KWS) in an input audio signal that contains keywords used to activate voice-based human-computer interactions. A KWS system may combine the latent representation generated by a denoising autoencoder (DAE) with audio features extracted from the audio signal using a machine learning approach. The DAE may be a discriminative DAE trained with a quadruplet loss metric learning approach to create a highly-separable latent representation of the audio signal in the audio input feature space. In one aspect, spectral characteristics of the audio signal such as Log-Mel features are combined with the latent representation generated by a quadruplet loss variational DAE (QVDQE) as input to a DNN KWS classifier. The KWS system improves keyword classification accuracy versus using extracted spectral features alone, non-discriminative DAE latent representations alone, or the extracted spectral features combined with the non-discriminative DAE latent representations in a KWS classifier.

20 Claims, 9 Drawing Sheets

(51) Int. Cl.
G10L 15/06 (2013.01)
G10L 15/08 (2006.01)
G10L 15/22 (2006.01)
G10L 25/18 (2013.01)

(52) U.S. Cl.
CPC ........ *G10L 25/18* (2013.01); *G10L 2015/088* (2013.01); *G10L 2015/223* (2013.01)

(56) References Cited

OTHER PUBLICATIONS

Chen et al., "Small-footprint keyword spotting using deep neural networks", IEEE Int. Conf. Acoust., Speech, Signal Process, pp. 4087-4091 (2014).
Variani et al., "Deep neural networks for small footprint text-dependent speaker verification", IEEE Int. Conf. Acoust., Speech Signal Process, pp. 4052-4056, (2014).
Panchapagesan et al., "Multi-task learning and weighted cross-entropy for DNN-based keyword spotting", Interspeech, vol. 9, pp. 760-764 (2016).
Lecun et al., "Learning methods for generic object recognition with invariance to pose and lighting", Proc. IEEE Comput, Soc. Conf. Comput. Vis. Pattern Recog., vol. 2, pp. 97-104. (2004).
Zhang et al. "Hello edge: Keyword spotting on microcontrollers", arXiv preprint arXiv:1711.07128, pp. 1-14 (2017).
Chauhan et al., "Mel frequency cepstral coeffi¬cients (MFCC) based speaker identification in noisy environment using wiener filter", IEEE Int. Conf on Green Comput. Commun. and Electr. Eng, pp. 1-5 (2014).
Meghanani, "An ex¬ploration of log-mel spectrogram and MFCC features for alzheimer's dementia recognition from spontaneous speech", IEEE Spoken Language Tech. Workshop, pp. 670-677.
Meng et al., "Speech emotion recog¬nition from 3d log-mel spectrograms with deep learning net-work", IEEE access, vol. 7, pp. 125868-125881 (2019).
Wang et al., "Spoofing speech detection using modified relative phase in¬formation", IEEE J. of selected topics in signal Process., vol. 11, No. 4, pp. 660-670 (2017).
Shao et al., "Integrated pitch and MFCC extraction for speech reconstruction and speech recognition ap¬plications", Eighth European Conf on Speech Commun. and Tech., 4 pgs. (2003).
Bhattacharjee et al., "A statistical analysis on the impact of noise on MFCC features for speech recognition", Int. Conf. on Recent Advances and Innovations in Eng., pp. 1-5 (2016).
Huang et al., "DNN-based speech enhancement using mbe model", 16th Int. Workshop on Acoustic Signal Enhancement, pp. 196-200 (2018).
Chai et al., "A cross-entropy-guided measure (CEGM) for assessing speech recognition performance and optimizing DNN-based speech enhancement", IEEE/ACM Trans. on Audio Speech and Language Process., vol. 29, pp. 106-117 (2020).
Park et al., "Specaugment: A simple data augmentation method for automatic speech recognition", arXiv preprint arXiv: 1904.08779, 6 pgs. (2019).
Ko et al., "A study on data augmentation of reverberant speech for robust speech recognition", IEEE Int. Conf. on Acoustics Speech and Signal Process, pp. 5220-5224 (2017).
Jaitly et al., "Vocal Tract Length Perturbation (VTLP) improves speech recognition", ICML Workshop on Deep Learn. for Audio Speech and Language Process, 5 pgs. (2013).
Verhelst et al., "An overlap-add technique based on waveform similarity (WSOLA) for high quality time-scale modification of speech", IEEE Int. Conf. on Acoustics Speech and Signal Process., vol. 2, pp. 554-557 (1993).
Kim, et al., "Generation of large-scale simulated utterances in virtual rooms to train deep-neural networks for far-field speech recognition in Google Home", Interspeech (2017).
Hannun, et al., "Deep Speech: Scaling up end-to-end speech recognition", arXiv preprint, arXiv:1412.5567, pp. 1-12 (2014).
Kayser et al., "Denoising convolutional autoen-coders for noisy speech recognition", CS231 Standford Reports, pp. 1-6 (2015).
Ishii et al., "Reverberant speech recognition based on denoising autoencoder", Interspeech, pp. 3512-3516 (2013).
Agrawal et al., "Modulation filter learning using deep variational networks for robust speech recognition", IEEE J. of Selected Topics in Signal Process., vol. 13, No. 2, pp. 244-253 (2019).
Chelimilla et al., "Joint distribution learning in the framework of variational autoencoders for far-field speech enhancement", IEEE Automatic Speech Recognition and Understanding Workshop, pp. 245-251 (2019).
Huh et al., "Metric learning for keyword spotting", IEEE Spoken Language Technology Workshop, pp. 133-140 (2021).
Lyons et al., "Improved deep representation learning for human activity recognition using IMU sensors", 20th IEEE Int. Conf. on Mach. Learn. and Appl., pp. 326-332 (2021).
Warden et al., "Speech commands: A dataset for limited-vocabulary speech recognition", arXiv preprint arXiv:1804.03209, pp. 1-11 (Apr. 2018).
Thiemann et al., "Demand: A collection of multi-channel recordings of acoustic noise in diverse environments", Proc. Meetings Acoust, pp. 1-6 (2013).
Kingma et al., "Adam : A method for stochastic optimization ," arXiv preprint arXiv:1412.6980, pp. 1-15 (2014).

* cited by examiner

Keyword Spotting Model Accuracy (%)

| Approach | Validation | Clean Test | Noisy Test |
|---|---|---|---|
| Baseline LM | 96.3 | 89.7 | 88.9 |
| CDAE LM | 98.7 | 88.6 | 89.1 |
| VDAE LM | 98.6 | 88.9 | 88.8 |
| CDAE LR | 95.9 | 93.1 | 92.8 |
| VDAE LR | 96.4 | 93.3 | 92.6 |
| QVDAE LR | 96.9 | 94.3 | 93.3 |
| LM & CDAE LR | 98.1 | 93.6 | 93.0 |
| LM & VDAE LR | 98.0 | 93.7 | 93.6 |
| LM & QVDAE LR | 99.0 | 95.1 | 94.3 |

FIG. 5

Keyword False Negative Rate (FNR) and False Positive Rate (FPR) for Seen Validation Speakers (Val), Unseen Test Speakers (TC), and Unseen Test Noisy Speakers (TN)

| | FNR | | | FPR | | |
|---|---|---|---|---|---|---|
| | Val | TC | TN | VAL | TC | TN |
| Baseline | 0.038 | 0.107 | 0.115 | 0.006 | 0.018 | 0.019 |
| CDAE LM | 0.014 | 0.122 | 0.114 | 0.002 | 0.019 | 0.019 |
| VDAE LM | 0.016 | 0.117 | 0.118 | 0.002 | 0.019 | 0.012 |
| CDAE LR | 0.045 | 0.072 | 0.076 | 0.007 | 0.012 | 0.012 |
| VDAE LR | 0.039 | 0.071 | 0.079 | 0.006 | 0.011 | 0.013 |
| LM & CDAE LR | 0.003 | 0.068 | 0.074 | 0.003 | 0.011 | 0.012 |
| LM & VDAE LR | 0.003 | 0.068 | 0.070 | 0.003 | 0.011 | 0.011 |
| LM & QVDAE LR | 0.002 | 0.054 | 0.062 | 0.002 | 0.008 | 0.010 |

FIG. 6

Keyword Noise Robustness Test Accuracy (%) for Baseline LM and LM & QVDAE LR Models

| | Quiet | | Stationary | | Non-Stationary | |
|---|---|---|---|---|---|---|
| | Baseline LM | LM & QVDAE LR | Baseline LM | LM & QVDAE LR | Baseline LM | LM & QVDAE LR |
| 1 ft | 94.4 | 96.6 | 92.1 | 95.3 | 87.3 | 93.5 |
| 3 ft | 92.6 | 95.8 | 90.5 | 95.0 | 80.8 | 88.4 |
| 6 ft | 94.0 | 95.8 | 87.4 | 94.7 | 71.8 | 80.0 |
| 9 ft | 93.6 | 96.3 | 87.4 | 93.8 | 60.9 | 71.0 |
| 12 ft | 92.1 | 95.7 | 85.6 | 92.6 | 59.2 | 67.0 |

FIG. 7

NOISE ROBUST REPRESENTATIONS FOR KEYWORD SPOTTING SYSTEMS

RELATED APPLICATIONS

This application claims priority to U.S. Provisional Patent Application No. 63/252,920, filed on Oct. 6, 2021, the disclosure of which is hereby incorporated herein in its entirety.

TECHNICAL FIELD

The present disclosure relates generally to speech recognition systems, and more particularly to keyword spotting or wake word detection.

BACKGROUND

An increasing number of modern computing devices feature speech recognition capabilities, allowing users to perform a wide variety of computing tasks via voice commands and natural speech. Devices such as mobile phones or smart speakers provide integrated virtual assistants that can respond to a user's commands or natural language requests by communicating over local and/or wide area networks to retrieve requested information or to control other devices, such as lights, heating and air conditioning controls, audio or video equipment, etc. For example, personal assistants such as Google Assistant, Apple's Siri, and Amazon's Alexa utilize speech recognition to enable human-computer interfaces. Devices with speech recognition capabilities often remain in a low power consumption mode until a specific word or phrase is spoken (i.e., a keyword, wake word or wake phrase), allowing a user to control the device using voice commands after the device is thus activated.

To initiate a voice based user interface, keyword spotting (KWS) or wake-word detection (WWD) is commonly deployed. Here, a keyword or key-phrase is continuously monitored and when detected, enables further voice based human-computer interaction. For example, Google Assistant continuously listens for the keywords "OK Google" to initiate voice input. Early KWS systems employed the Gaussian Mixture Model-Hidden Markov Model (GMM-HMM) for acoustic modeling. More recently, machine learning or deep neural networks (DNNs) have become an attractive choice due to their increased accuracy over traditional methods. Keyword spotting poses several challenges due to acoustic disturbances such as noise and reverberation, which are omnipresent in almost all acoustic environments. Other challenges include speaker-to-speaker variations or scenarios where the microphone is blocked or covered. As such, it is desirable for KWS systems to perform reasonably well in a challenging environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 illustrates a comparison of keyword spotting accuracy for a KWS system that combines Log-Mel input features and the latent representation of a quadruplet loss variational denoising autoencoder (QVDAE) with other KWS systems, according to one aspect of the present disclosure.

FIG. 6 illustrates a comparison of keyword false negative rate (FNR) and false positive rate (FPR) for seen validation speakers, unseen test speakers, and unseen test noisy speakers for a KWS system that combines Log-Mel input features and the latent representation of a QVDAE with other KWS systems, according to one aspect of the present disclosure.

FIG. 7 illustrates a comparison of keyword noise robustness accuracy to various noise scenarios for a KWS system that combines Log-Mel input features and the latent representation of a QVDAE with other KWS systems, according to one aspect of the present disclosure.

DETAILED DESCRIPTION

Figure 1:
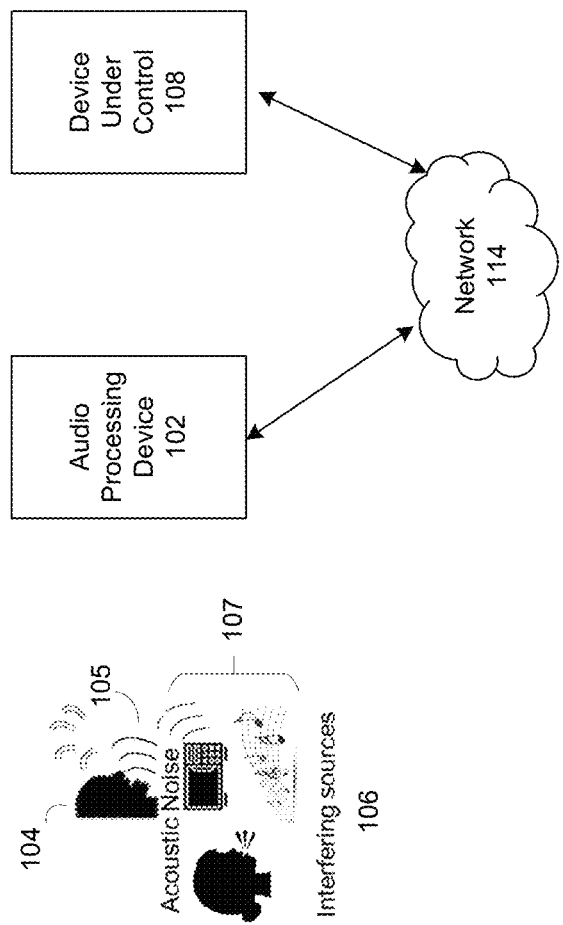
FIG. 1 illustrates an audio processing device listening to voice commands including monitoring for a keyword used to initiate voice-based interactions with the audio processing device or to control another device, according to one aspect of the present disclosure.

Examples of various aspects and variations of the subject technology are described herein and illustrated in the accompanying drawings in order to provide a thorough understanding of the present embodiments. It will be evident, however, to one skilled in the art that the present embodiments may be practiced without some specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Keyword spotting (KWS) is the task of detecting certain keywords in a continuous stream of audio data to activate voice-based human-computer interactions with a device. Deep learning or deep neural networks (DNNs) have become an attractive choice for classifiers used in KWS systems due to their increased accuracy over traditional methods. DNNs may model short-term time and frequency correlations that are present in audio. Examples of DNNs used in KWS systems may include deep dense neural networks (DDNN), deep convolutional neural networks (DCNN), deep recurrent neural networks, and deep convolutional recurrent networks (DCRNN).

Log-Mel spectrograms and Mel Frequency Cepstral Coefficients (MFCC) are features that may be used in solving deep learning audio problems. These features are suitable for KWS classifiers since they carry the vocal tract dynamics and pulse train associated with the glottal motor control. However, since both are compact amplitude-based features optimized for discriminating between different speech sounds, they may lose valuable information in the presence of noise. They may also be sensitive to frequency perturbations.

Speech enhancement and data augmentation techniques may be used to improve the performance of KWS systems in noisy conditions by providing improved integrity and diversity in the training data respectively. For example, performance for speakers who are not part of the training data, referred to as unseen speakers, may improve with data augmentation techniques such as vocal tract length perturbation (VTLP), time-warping via waveform similarity overlap-add (WSOLA) method, acoustic room simulation, and the addition of background noise. While such techniques can provide robustness against variations in the keywords uttered by different speakers under some noisy environments, they may not address performance degradation due to severe acoustic disturbances.

Denoising autoencoders (DAEs) may be used to create noise-robust audio features by exploiting reconstructive and generative attributes of the DAEs. Two types of DAE architectures, convolutional DAEs (CDAE) and variational DAEs, may improve performance in noisy conditions. However, DAEs that are designed to minimize reconstruction error may cause a loss of information that could be important in the classifier. As a result, the performance in noise is improved but the performance for unseen speakers may degrade.

Disclosed are methods and architectures for a noise-robust and speaker-independent KWS system that overcomes the challenges in systems designed with heavily augmented data and/or denoised features. In one aspect of the disclosure, techniques are presented to improve the noise robustness of the KWS by combining the latent representation of a DAE with feature vectors extracted from the original audio signal using a DCNN. The features extracted from the original audio signal may include spectral or spectro-temporal descriptors generated from Log-Mel spectrograms, MFCC, short-time Fourier transform (STFT), wavelet spectrogram, etc., or their augmented feature vectors. In one embodiment, Log-Mel feature vectors may be combined with the DAE latent representation to provide improved performance for KWS classification.

In one aspect of the disclosure, as the KWS task entails the separation of the audio input feature space, the KWS performance for unseen speakers may be improved by using a discriminative DAE to ensure a well-separated latent representation. In one embodiment, the discriminative DAE may be a quadruplet loss variational denoising autoencoder (QVDAE) trained with a quadruplet loss metric learning approach. The discriminative DAE generates a discriminative latent representation of the audio signal that when combined with the extracted spectral features results in an improved architecture for KWS. In particular, the architecture improves keyword classification accuracy versus using the extracted spectral features alone, a non-discriminative DAE latent representation alone, or the extracted spectral features combined with a non-discriminative DAE latent representation in a KWS classifier.

In one aspect, a method for classifying keywords may include receiving an audio signal that includes speech data and interference. The speech data may contain one or more keywords used to initiate voice command for interfacing with a device. The method may use a machine-learning network (e.g., DNN) to determine spectral characteristics of the audio signal. The machine-learning network may determine a discriminative latent representation of the audio signal. The discriminative latent representation may group similar classes of the speech data to similar regions in an audio input feature space. The method may use the machine-learning network to combine the spectral characteristics and the discriminative latent representation to generate combined-feature vectors. The method may use the machine-learning network to detect the one or more keywords based on the combined-feature vectors.

FIG. 1 illustrates an audio processing device 102 listening to voice commands including monitoring for a keyword used to initiate voice-based interactions with the audio processing device 102 or to control another device 108, according to one aspect of the present disclosure. The audio processing device 102 may detect the keyword to activate automatic speech recognition (ASR) and may control a device or application such as the audio processing device 102 itself or the other device 108 based on a recognized audio command. The audio processing device 102 is shown to receive sound waves 105 from a target audio source 104 and sound waves 107 from one or more audio interference sources 106. The audio processing device 102 may itself emit audio interference (not shown) (e.g., through speakers).

The audio processing device 102 is also shown to interact with network(s) 114 through communication link(s). To facilitate keyword detection and speech recognition, the audio processing device 102 may provide noise cancellation to remove some or all of the audio interference received from the audio interference sources 106. In an embodiment, noise cancellation may be implemented using Independent Component Analysis (ICA) in which incoming signals (e.g., from a microphone) are separated by sources (e.g., signals from the target audio source 104 and the audio interference sources 106) then the audio data of the incoming signals is compared with the separated components to determine which components may be removed to estimate the speech signal from the target audio source 104. In other embodiments, noise cancellation may utilize adaptive filters, neural networks, or any techniques that may be used to attenuate non-target components of a signal.

The target audio source 104 may provide the sound waves 105 that correspond to a keyword. In some embodiments, the target audio source 104 may interact with the network(s) 114 over the communication link(s). The target audio source 104 may be an animate (e.g., human) or an inanimate object (e.g., a machine). Audio interference sources 106 may be sources of the sound waves 107 that interfere with detection of the keyword corresponding to the sound waves 105. The audio processing device 102 may receive the audio interference through the network(s) 114. Audio interference sources may include loudspeakers, televisions, video games, industrial sources of noise, or any other noise sources.

A second device under control 108 is shown to be coupled to the network(s) 114 via the link(s). Functions, logic, firmware, or software applications of the second device 108 may be initiated responsive to audio command received by the audio processing device 102. Examples of second devices under control 108 may include white goods, home automation controllers, thermostats, lighting, automated blinds, automated door locks, automotive controls, windows, industrial controls and actuators, etc.

Network(s) 114 may include one more types of wired and/or wireless networks for communicatively coupling the network nodes of FIG. 1 to one another. Network(s) 114 may include, but not limited to, a wireless local area network (WLAN) (e.g., Wi-Fi, 802.11 compliant), PANs (e.g., Bluetooth SIG standard or Zigbee, IEEE 802.15.4 compliant), and the Internet. In an embodiment, the audio processing device 102 may be communicatively coupled to an ASR application through Wi-Fi and the Internet.

Figure 2:
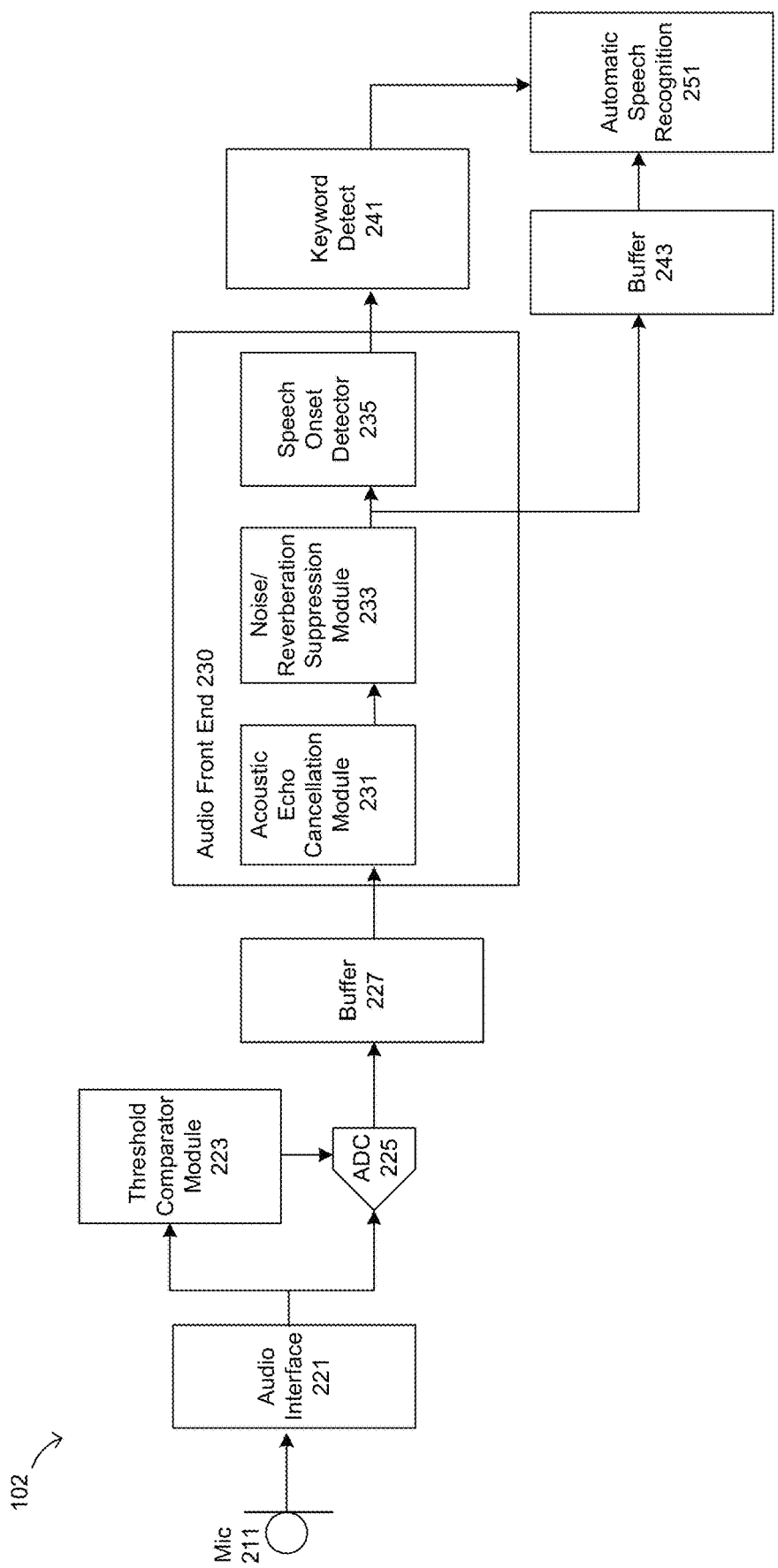
FIG. 2 illustrates hardware components and processing modules of an audio processing device that listens for keywords and voice commands, according to one aspect of the present disclosure.

FIG. 2 illustrates hardware components and processing modules of an audio processing device 102 that listens for keywords and voice commands, according to one aspect of the present disclosure. The audio processing device 102 is shown to include functional blocks including a microphone array 211, an audio interface 221, a threshold computation module 223, an audio analog-digital converter (ADC) 225, an audio front end 230, buffers 227 and 243, a keyword detect module 241, and an ASR module 251. Each functional block may be implemented using hardware (e.g., circuitry), instructions (e.g., software and/or firmware), or a combination of hardware and instructions. In one embodiment, some or all of the audio processing device 102 may be implemented by circuitry in an integrated circuit device (i.e., on a single integrated circuit substrate) or in a single device package. In alternative embodiments, the components of the audio processing device 102 may be distributed among multiple integrated circuit devices, device packages, or other circuitry.

The microphone array 211 is configured to receive sound waves such as sound waves 105 and 107 of FIG. 1. Microphone array 211 may include one or more microphones. Each microphone of the microphone array 211 may include a transducer or other mechanism (e.g., a diaphragm) to convert the energy of sound waves into an electronic signal (e.g., audio data). When the sound waves 105 and 107 are received during a common period, the audio data includes components that correspond to both the sound waves 105 and 107. The microphone array 211 may be part of the audio interface 221 or a separate peripheral device that is external to the audio processing device 102. In some embodiments, the microphone array 211 may include threshold/hysteresis settings for activity detection and measurement.

The audio interface 221 includes circuitry to process and analyze the audio data received from the microphone array 211. The audio interface 221 may provide signal processing (e.g., demodulation, mixing, filtering) to analyze or manipulate attributes of the audio data (e.g., phase, wavelength, frequency). The audio interface 221 may also perform beam forming and/or other noise suppression or signal conditioning methods to improve the performance in the presence of noise, reverberation, etc.

The threshold comparator module 223 may determine whether the processed audio data from the audio interface 221 meets or exceeds an activation threshold and whether the corresponding audio data may be digitized by the ADC 225 and passed on to the audio front end 230 for processing. In various embodiments, the activation threshold may be an energy level, an amplitude, a frequency, or any other attribute of a sound wave. The threshold comparator module 223 may store the activation threshold, which may be dynamically reprogrammable. The threshold comparator module 223 may monitor ambient noise to dynamically compute and potentially readjust the activation threshold of audio that may trigger speech onset detection. The buffer may store the digitized audio data for processing by the audio front end 230.

The audio front end 230 may include an acoustic echo cancellation module 231, a noise/reverberation suppression module 233, and a speech onset detector (SOD) 235. The acoustic echo cancellation module 231 may remove audio playback signals projected by a speaker (not shown) of the audio processing device 102 and picked up by the microphone 211. The noise/reverberation suppression module 233 may perform noise suppression or signal conditioning methods to improve the signal quality of the audio data in the presence of noise, reverberation, etc. The SOD 235 may determine whether the audio data represents the start of speech or other sound onset events.

Upon detecting a speech onset event, the SOD 235 may wake up the keyword detector module 241 from a low power consumption state (e.g., sleep state) to a higher power consumption state (e.g., active state) to perform keyword spotting (KWS), as will discussed further below. The gating of the keyword detect module 241 in this way may lighten the average system processing load and reduce the false acceptance rate (FAR) by minimizing the background noise and spurious audio that a KWS system considers. The buffer 243 may store the audio data including a command or query that is passed to the automatic speech recognition module 251 after a keyword has been detected.

Figure 3:
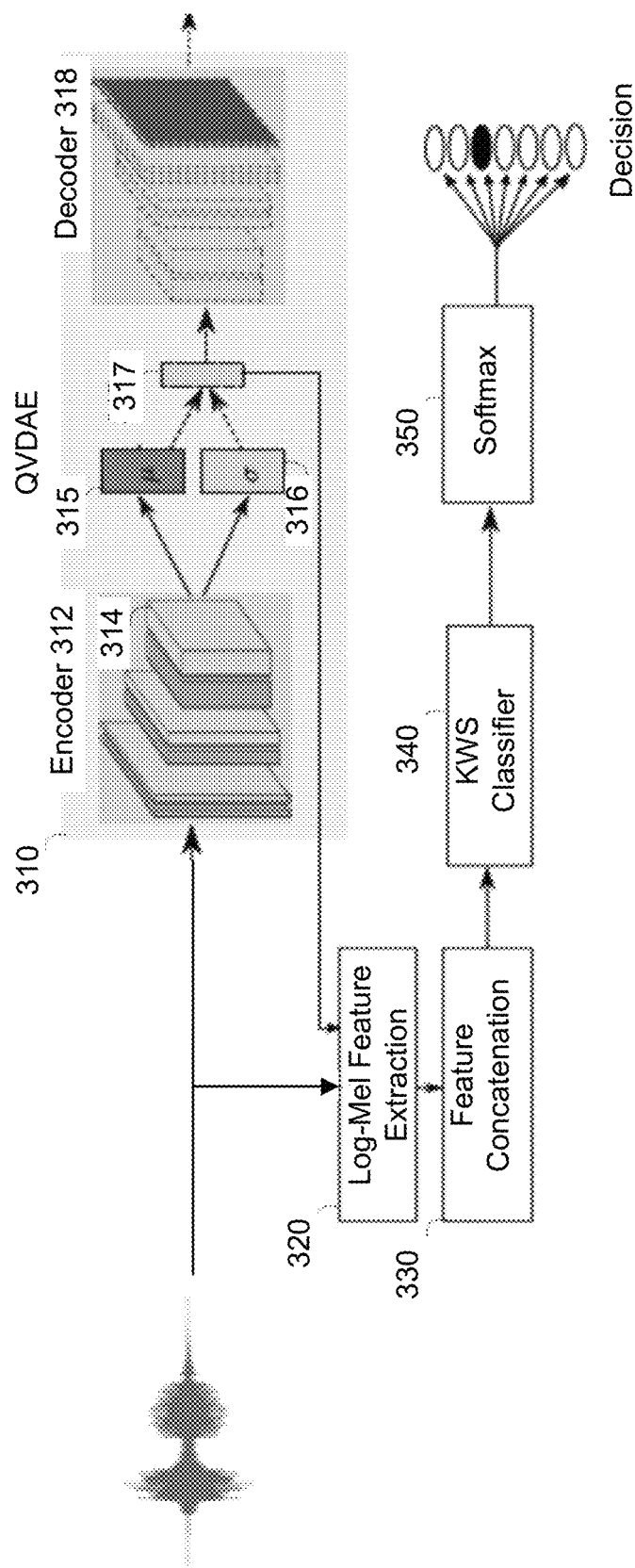
FIG. 3 illustrates a block diagram of processing modules of a keyword spotting system implemented by an audio processing device, according to one aspect of the present disclosure.

KWS systems may be described as either open or closed loop classification problems. The KWS system described in the present disclosure poses the task as a closed loop classification problem, which is a valid paradigm in the voice control pipeline if it follows a wake word detection system designed to handle negative examples. Other components of such a system may be the SOD, a Hidden Markov Model responsible for the post processing of the KWS classifier outputs, and a language model FIG. 3 illustrates a block diagram of processing modules of a KWS system implemented by the audio processing device 102, according to one aspect of the present disclosure. A DAE creates a latent representation of the audio signal that is introduced as a noise-robust feature in the KWS classifier 340. The DAE may include an encoder 312 that includes multiple convolutional blocks 314. In one embodiment, each convolutional block 314 may contain a convolutional 2D layer followed by a rectified linear unit (ReLU) activation and batch normalization in that order. The encoder 312 may produce a lean representation of the statistical distribution of the audio signal such as $\mu$ 315 and $\sigma$ 316. A bottleneck layer 317 may follow the encoder 312, after which a decoder 318 may be placed to mirror the encoder block 312. The DAE may be trained as a CDAE, VDAE, or a discriminative model by changing only the loss function and training process, while the model architecture remains the same for all DAE variants.

In one aspect, a discriminative DAE is trained to create the latent representation that projects audio input samples of a similar class to similar regions in the audio input feature space to improve separability. Such latent representation results in noise-robust and discriminative features of the audio signal. This may be preferred to the CDAE, which uses a Euclidean distance cost function, or the VDAE, which uses a weighted cost function of Euclidean distance and Kullback-Leibler (KL) divergence. These cost functions do not necessarily encourage class separability, as they focus instead on realistic and high-fidelity reconstructions.

Metric learning loss functions such as triplet loss may learn latent representations that are highly separable and discriminative. A triplet loss variational autoencoder may be used to reduce the false positive rate of non-target keywords. However, a drawback of such distance metric learning can be slow convergence due to a large number of training pairs (triplets) used for larger datasets. Compared to triplet loss, where three tuples of input examples are used, four tuples are used in quadruplet loss (an extra negative example is included, ensuring a relation pair between two negative examples, i.e. negative$_1$ and negative$_2$ is ensured during training). The extra negative example increases the model's discriminative properties and helps it converge faster than triplet loss. Therefore, the quadruplet loss is chosen as the discriminative training loss for the variational denoising autoencoder (VDAE) rather than triplet loss.

As shown in FIG. 3, the DAE trains a quadruplet loss variational denoising autoencoder (QVDAE) 310 to encourage a latent representation that is well-separated and groups similar classes close together. The quadruplet loss is defined as:

$$L_{quad} = \sum_{i,j,k}^{N} \left[ g(\underline{u}_i, \underline{u}_j)^2 - g(\underline{u}_i, \underline{u}_k)^2 + \alpha_1 \right]_+ \quad \text{(Eq. 1)}$$
$$+ \sum_{i,j,k,l}^{N} \left[ g(\underline{u}_i, \underline{u}_j)^2 - g(\underline{u}_j, \underline{u}_k)^2 + \alpha_2 \right]_+$$

where $\alpha_1$ and $\alpha_2$ are the margins, and, unlike triplet loss which uses a fixed Euclidean distance, g is the learned distance function. $\underline{u}$ represents the input vector, $g(\underline{u}_i, \underline{u}_1)^2$ represents the distance between anchor and positive, $g(\underline{u}_i, \underline{u}_k)^2$ represents the distance between anchor and negative$_1$ and $g(\underline{u}_j, \underline{u}_k)^2$ represents the distance between negative$_1$ and negative$_2$ mean embeddings.

The QDVAE 310 passes a complete random quadruplet study batch to a learned metric network to generate the distances between mean embeddings. Mahalanobis' distance may be preferred to account for the multivariate correlation. Finally, the total quadruplet loss $L_{tot}$ is defined as:

$$L_{tot} = L_{quad} + L_{KL} + L_M \quad \text{(Eq. 2)}$$

where $L_{quad}$ is the quadruplet loss of Eq. 1, $L_{KL}$ is the KL divergence loss at the latent vector, and $L_M$ is the Mahalanobis distance error of reconstruction.

In one embodiment, the convolutional filter values for the QVDAE encoder's (312) convolutional layers are 32, 64, 64, and 128. The convolutional filter sizes are all 3, and the convolutional strides are 1, 2, 2, and 1 respectively. Batch normalization and a leaky ReLU activation follow each convolutional layer. The latent representation extracted from the DAE's bottleneck layer 317 has the dimension of 256.

The convolutional Log-Mel feature extractor layers 320 may include two blocks. Each of the blocks may contain a convolutional 2D layer followed by a batch normalization layer, a ReLU activation, a max pooling 2D layer and a dropout layer in that order. In one embodiment, the convolutional filter values for the Log-Mel feature extractor's (320) convolutional layers are 32 and 64, and the convolutional strides are both of shape (1, 2). The convolutional layers use the ReLU activation. Max pooling of pool size (2, 2) is used after batch normalization, with a dropout rate of 0.1.

The KWS classifier 340 may be a DDNN, including the feature concatenation block 330, that flattens and concatenates the feature vector inputs from the Log-Mel feature extractor 320 and the DAE's latent representation. The classifier head may include three hidden dense layers with ReLU activations and dropout. In one embodiment, the classifier includes three dense layers of dimensions 28, 64, and 32. The layers all use a dropout rate of 0.1 and a ReLU activation. The single feature vector is fed to a DNN softmax classifier 350. The final dense layer may use a softmax activation and an output for each keyword class. In one embodiment, the output softmax dense layer has 7 output classes. In other embodiments, the KWS classifier 340 may utilize any DNN architectures or discriminative training methods for classification.

Advantageously, using a discriminative loss with a DAE to achieve a highly noise-robust and well-separated latent representation such as by training a classifier using quadruplet loss, when combined with the classifier's extracted feature vectors such as the Log-Mel features, results in improved softmax classifier performance. In other embodiments, triplet loss or loss similar discriminative loss, may also be used to learn such a noise-robust latent representation.

Figure 4:
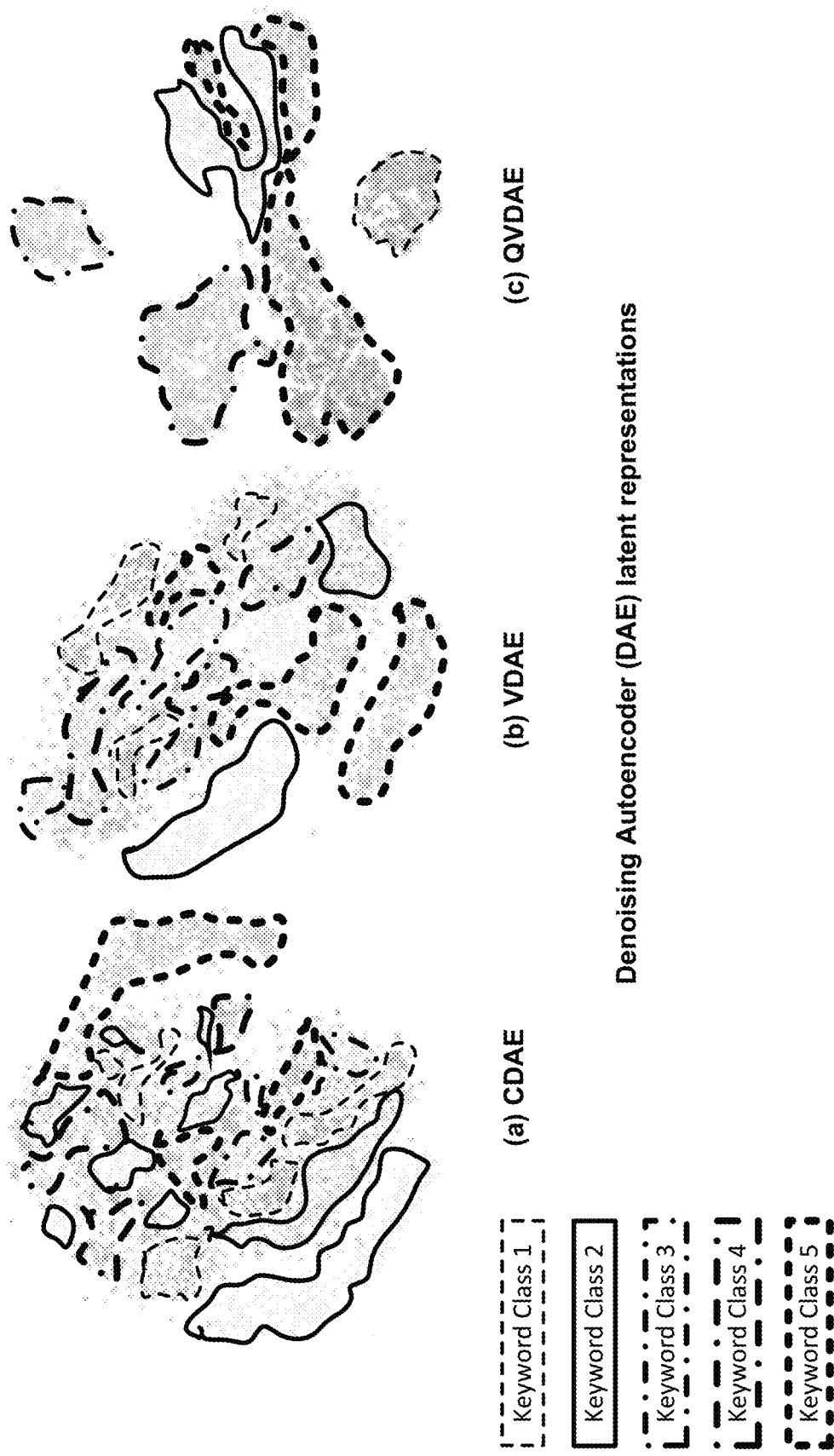
FIG. 4 illustrates a comparison of the classification capabilities of various types of denoising autoencoders (DAEs) in separating the latent representations for keywords of different classes in an audio input feature space, according to one aspect of the present disclosure.

FIG. 4 illustrates a comparison of the classification capabilities of various types of DAEs in separating the latent representations for keywords of different classes in an audio input feature space, according to one aspect of the present disclosure. Visualization (a) shows the latent representations for input samples of different keyword classes for a CDAE; visualization (b) shows the latent representations for input samples of different keyword classes for a VDAE; and visualization (c) shows the latent representations for input samples of different keyword classes for a QVDAE. Comparisons of the three illustrations indicate that the classification ability of the QVDAE achieves better separation of the latent representations than those of CDAE and VDAE because input samples of a keyword class are located in a similar input feature space and well-separated from those belonging to other keyword classes.

The improved noise-robustness of the KWS system resulting from combining the Log-Mel features extracted from the input audio signal and the DAE's discriminative latent representation to provide feature vectors for a keyword classifier may be shown by comparison with keyword classifiers that use the extracted spectral features alone, the non-discriminative DAE latent representation alone, or the extracted spectral features combined with the non-discriminative DAE latent representation.

FIG. 5 illustrates a comparison of keyword spotting accuracy for a KWS system that combines Log-Mel input features and the latent representation of a QVDAE with other KWS systems, according to one aspect of the present disclosure.

Three KWS systems are chosen as references and compared against the system using a combination of the Log-Mel features and the discriminative quadruplet loss latent representation as input to the KWS classifier, abbreviated as LM & QVDAE LR. The first reference system, the baseline Log-Mel, is a convolution-based DNN classifier with only Log-Mel input. The other two reference systems are based on DAEs, using the same classifier as the baseline Log-Mel but the input features are denoised Log-Mel output. For the purpose of legibility, abbreviations of "Log-Mel" (LM) and "latent representation" (LR) are used hereafter. Depending on the autoencoder type, they are abbreviated as either CDAE LM or VDAE LM, both using the non-discriminative denoised reconstructions as the only input to the KWS classifier.

Other KWS systems are evaluated leading up to LM & QVDAE LR to highlight the incremental performance improvements of the LM & QVDAE LR architecture. For example, CDAE LR and VDAE LR use the non-discriminative LRs as the only input to the KWS classifier; QVDAE LR uses the discriminative quadruplet loss LRs as the only input to the KWS classifier; LM & CDAE LR and LM & VDAE LR use a combination of the LM and the non-discriminative LRs as input to the KWS classifier.

FIG. 5 shows that when tested on both the "seen" validation speakers that are part of the speakers in the training dataset ("validation" column) and the "unseen" test speakers that are not part of the speakers in the training dataset in clean (the "clean test" column) and noisy environments ("noisy test" column), LM & QVDAE LR performs best in both clean and noisy environments. CDAE and VDAE performance are equivalent in the KWS classifier trained using their denoised Log-Mel or latent representation features. The improved class separation of QVDAE LR translates into further improvement in the performance for LM & QVDAE LR.

FIG. 5 further shows that using only the latent representation as input provides a significant improvement in unseen talkers when compared to Log-Mel. While the latent representation features experience a performance reduction on the validation speakers, this may be seen as a positive, indicating that they provide an improved representation of the general keyword, independent of the speaker. The Log-Mel alone approach results in a worse generalization compared to LM & QVDAE LR. Combining Log-Mel with the latent representation reintroduces speaker dependence, but also slightly improves unseen talker performance, suggesting better generalization in noisy environments than the non-discriminative CDAE or VDAE latent representations. Use of the denoised Log-Mel output only without the latent representations provides no significant performance boost on unseen speakers when compared to the baseline approach, highlighting the performance of the latent representation as a noise robust feature.

FIG. 6 illustrates a comparison of keyword false negative rate (FNR) and false positive rate (FPR) for seen validation speakers, unseen test speakers, and unseen test noisy speakers for a KWS system that combines Log-Mel input features and the latent representation of a QVDAE with other KWS systems, according to one aspect of the present disclosure. The results showcase the improved performance when incorporating the discriminative loss trained latent representation as additional features in the softmax classifier.

FIG. 7 illustrates a comparison of keyword noise robustness accuracy to various noise scenarios for a KWS system that combines Log-Mel input features and the latent representation of a QVDAE with other KWS systems, according to one aspect of the present disclosure. The noise scenarios include locating the target speaker at 1, 3, 6, 9, and 12 feet from a microphone and positioning the noise source at 6 feet and 45 degrees from the line between the target speaker and the microphone. The noise source may be stationary (e.g., air conditioner) or non-stationary (e.g., music recording).

The results show that LM & QVDAE LR performs significantly better than the baseline approach in the presence of background noise and reverberation. With background noise, the baseline LM's performance deteriorates at a greater rate as distance is increased when compared to that of LM & QVDAE LR. The results show that the KWS accuracy of LM & QVDAE LR generalizes well for unseen speakers in noisy conditions and at distance. The latent representations learned by a denoising autoencoder are more robust to noise than the popular Log-Mel spectrogram features and generalize better for unseen speakers. The use of latent representations removes the need for extra cycles that can be required for reconstructing a denoised signal. The use of discriminative quadruplet loss to create latent representations as features in the closed-loop KWS classifier also improves keyword classification accuracy versus using the non-discriminative denoising autoencoder latent representations.

Figure 8:
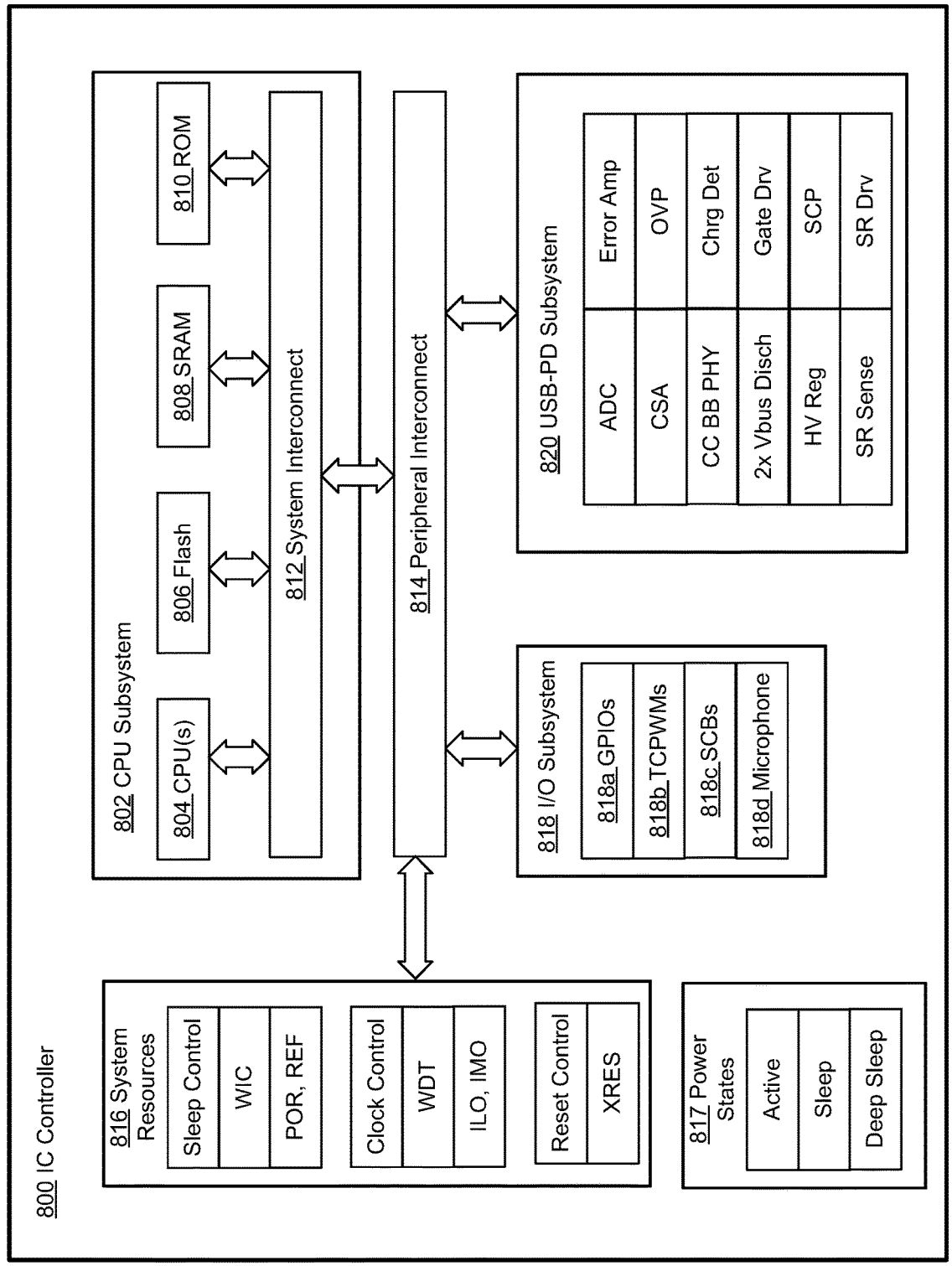
FIG. 8 illustrates a block diagram of an IC controller containing CPU subsystem, systems resources, and input/output (I/O subsystem) that is configured for keyword spotting, according to one aspect of the present disclosure.

FIG. 8 illustrates a block diagram of an IC controller 800 containing CPU subsystem 803, systems resources 816, and input/output (I/O subsystem) 818 that is configured for keyword spotting, according to one aspect of the present disclosure.

CPU subsystem 802 includes one or more CPUs (central processing units) 804, flash memory 806, SRAM (Static Random Access Memory) 808, and ROM (Read Only Memory) 810 that are coupled to system interconnect 812. CPU 804 is a suitable processor that can operate in an IC or a SoC device. Flash memory 806 is non-volatile memory (e.g., NAND flash, NOR flash, etc.) that is configured for storing data, programs, and/or other firmware instructions. Flash memory 806 is tightly coupled within the CPU subsystem 802 for improved access times. SRAM 808 is volatile memory that is configured for storing data and firmware instructions accessed by CPU 804. ROM 810 is read-only memory (or other suitable storage medium) that is configured for storing boot-up routines, configuration parameters, and other firmware parameters and settings. System interconnect 812 is a system bus (e.g., a single-level or multi-level Advanced High-Performance Bus, or AHB) that is configured as an interface that couples the various components of CPU subsystem 802 to each other, as well as a data and control interface between the various components of the CPU subsystem and peripheral interconnect 814.

Peripheral interconnect 814 is a peripheral bus (e.g., a single-level or multi-level AHB) that provides the primary data and control interface between CPU subsystem 802 and its peripherals and other resources, such as system resources 816, I/O subsystem 818, and Universal Serial Bus Power Delivery (USB-PD) subsystem 820. The peripheral interconnect 814 may include various controller circuits (e.g., direct memory access, or DMA controllers), which may be programmed to transfer data between peripheral blocks without burdening the CPU subsystem 802. In various embodiments, each of the components of the CPU subsystem and the peripheral interconnect may be different with each choice or type of CPU, system bus, and/or peripheral bus.

System resources 816 include various electronic circuits that support the operation of IC controller 800 in its various states and modes. For example, system resources 816 may include a power subsystem having analog and/or digital circuits for each controller state/mode such as, for example, sleep control circuits, wake-up interrupt controller (WIC), power-on-reset (POR), voltage and/or current reference (REF) circuits, etc. In some embodiments, the power subsystem may also include circuits that allow IC controller 800 to draw and/or provide power from/to external sources with several different voltage and/or current levels and to support controller operation in several power states 817 (e.g., such as active state, sleep state, and a deep sleep state with clocks turned off). Further, in some embodiments the CPU subsystem 802 may be optimized for low-power operation with extensive clock gating and may include various internal controller circuits that allow the CPU to operate in the various power states 817. For example, the CPU may include a wake-up interrupt controller that is configured to wake the CPU from a sleep state, thereby allowing power to be switched off when the IC chip is in the sleep state. System resources 816 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 816 may also include analog and/or digital circuit blocks that provide reset control and support external reset (XRES).

I/O subsystem 818 includes several different types of I/O blocks and subsystems. For example, I/O subsystem 818 includes GPIO (general purpose input output) blocks 818a, TCPWM (timer/counter/pulse-width-modulation) blocks 818b, and SCBs (serial communication blocks) 818c. GPIOs 818a include analog and/or digital circuits configured to implement various functions such as, for example, pull-ups, pull-downs, input threshold select, input and output buffer enabling/disabling, multiplex signals connected to various I/O pins, etc. TCPWMs 818b include analog and/or digital circuits configured to implement timers, counters, pulse-width modulators, decoders and various other analog/mixed signal elements that are configured to operate on input/output signals. SCBs 818c include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc. USB-PD subsystem 820 provides the interface to a power connector such a USB Type-C port.

Figure 9:
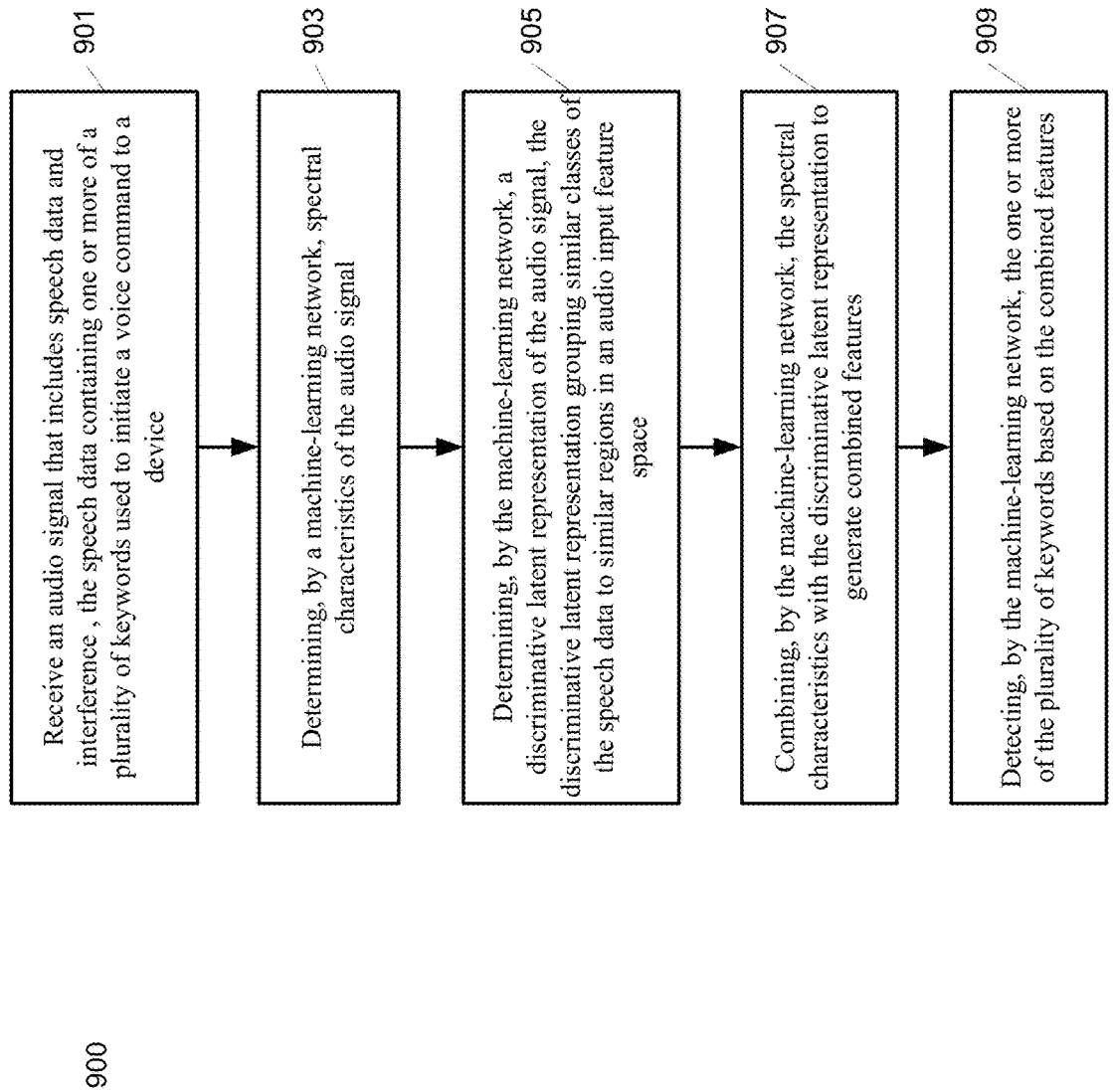
FIG. 9 illustrates a flow diagram of a method for classifying keywords, according to one aspect of the present disclosure.

FIG. 9 illustrates a flow diagram of a method 900 for classifying keywords, according to one aspect of the present disclosure. In one aspect, the method 900 may be performed by an audio processing device utilizing hardware, software, or combinations of hardware and software, such as the audio processing device 102 of FIG. 1 or 2, or the IC controller 800 of FIG. 8.

In operation 901, an audio processing device receives an audio signal that includes speech data and interference. The speech data may contain one or more keywords used to initiate voice command for interfacing with a device.

In operation 903, the audio processing device uses a machine-learning network (e.g., DNN) to determine spectral characteristics of the audio signal. In one aspect, the spectral characteristics may be Log-Mel feature vectors extracted from the audio signal.

In operation 905, the machine-learning network determines a discriminative latent representation of the audio signal. The discriminative latent representation may group similar classes of the speech data to similar regions in an audio input feature space. In one aspect, the discriminative latent representation may be generated by a quadruplet loss variational denoising autoencoder (QVDAE) to encourage a latent representation that is well-separated and groups similar classes close together.

In operation 907, the machine-learning network combines the spectral characteristics and the discriminative latent representation to generate combined-feature vectors. In one aspect, the machine-learning network may concatenate the Log-Mel feature vectors extracted from the audio signal with the discriminative latent representation of the audio signal generated by the QVDAE.

In operation 909, the machine-learning network detects the one or more keywords based on the combined-feature vectors. In one aspect, a KWS classifier may use feature vectors generated from the concatenation of the Log-Mel feature vectors and the discriminative latent representation of the QVDAE to classify the keywords.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for particular purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform methods disclosed herein. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A method of classifying keywords, comprising:
    receiving an audio signal that includes speech data and interference, the speech data containing one or more of a plurality of keywords used to initiate a voice command to a device;
    determining, by a machine-learning network, spectral characteristics of the audio signal;
    determining, by the machine-learning network, a discriminative latent representation of the audio signal, the discriminative latent representation grouping similar classes of the speech data to similar regions in an audio input feature space;
    combining, by the machine-learning network, the spectral characteristics and the discriminative latent representation to generate combined features; and
    detecting, by the machine-learning network, the one or more of the plurality of keywords based on the combined features.

2. The method of claim 1, wherein determining the spectral characteristics of the audio signal comprises:
    dividing the audio signal into a plurality of frames; and
    determining, by the machine learning network, Log-Mel spectrograms or Mel Frequency Cepstral Coefficients (MFCC) of the plurality of frames.

3. The method of claim 1, wherein determining the discriminative latent representation of the audio signal comprises:
    determining, by the machine-learning network of a denoising autoencoder (DAE), the discriminative latent representation, wherein the DAE is trained to increase distances among different classes of the speech data and to decrease distances among similar classes of the speech data in the audio input feature space.

4. The method of claim 3, wherein the DAE comprises a quadruplet loss variational DAE (QVDAE) that is trained using sets of four-tuple training vectors, wherein each set of the four-tuple training vectors includes an anchor example, a positive example, and two negative examples.

5. The method of claim 4, wherein the QVDAE is trained comprises:
    training the QVDAE using a cost function to reduce a learned distance between the anchor example and the positive example, to increase a learned distance between the anchor example and one of the two negative examples, and to increase a learned distance between the two negative examples.

6. The method of claim 1, wherein combining the spectral characteristics and the discriminative latent representation comprises:
    generating, by the machine-learning network, the combined features by concatenating the spectral characteristics and the discriminative latent representation.

7. The method of claim 1, wherein detecting the one or more of the plurality of keywords comprises:
    classifying, by the machine-learning network, the plurality of keywords into separate classes based on the combined features.

8. The method of claim 1, wherein detecting the one or more of the plurality of keywords using the combined features of the spectral characteristics and the discriminative latent representation comprises:
    reducing a false positive rate of detecting a non-target keyword not belonging to the plurality of keywords when compared to using the spectral characteristics alone or using a non-discriminative latent representation to detect the plurality of keywords, wherein the non-discriminative latent representation reduces reconstruction errors compared to the discriminative latent representation; and
    reducing a false negative rate of failing to detect the one or more of the plurality of keywords when compared to using the spectral characteristics alone or using the non-discriminative latent representation to detect the plurality of keywords.

9. The method of claim 1, further comprising:
determining, by the machine-learning network, the voice command from the audio signal responsive to detecting the one or more of the plurality of keywords; and
initiating interactions with the device based on the voice command.

10. A system comprising:
a memory configured to store instructions; and
a processing device, operatively coupled to the memory, the processing device configured to execute the instructions stored in the memory to:
receive an audio signal that includes speech data and interference, the speech data containing one or more of a plurality of keywords used to initiate a voice command to the system;
determine, based on a first learned mapping, spectral characteristics of the audio signal;
determine, based on a second learned mapping, a discriminative latent representation of the audio signal, the discriminative latent representation grouping similar classes of the speech data to similar regions in an audio input feature space;
combine, based on a third learned mapping, the spectral characteristics and the discriminative latent representation to generate combined features; and
detect, based on a fourth learned mapping, the one or more of the plurality of keywords using the combined features.

11. The system of claim 10, wherein to determine the spectral characteristics of the audio signal, the processing device is configured to:
divide the audio signal into a plurality of frames; and
determine, based on the first learned mapping, Log-Mel spectrograms or Mel Frequency Cepstral Coefficients (MFCC) of the plurality of frames.

12. The system of claim 10, wherein to determine the discriminative latent representation of the audio signal, the processing device is further configured to:
determine, based on a learned mapping of a denoising autoencoder (DAE), the discriminative latent representation, wherein the DAE is trained to increase distances among different classes of the speech data and to decrease distances among similar classes of the speech data in the audio input feature space.

13. The system of claim 12, wherein the DAE comprises a quadruplet loss variational DAE (QVDAE) that is trained using sets of four-tuple training vectors, wherein each set of the four-tuple training vectors includes an anchor example, a positive example, and two negative examples.

14. The system of claim 13, wherein to train the QVDAE, the processing device is further configured to:
train the QVDAE using a cost function to reduce a learned distance between the anchor example and the positive example, to increase a learned distance between the anchor example and one of the two negative examples, and to increase a learned distance between the two negative examples.

15. The system of claim 10, wherein to combine the spectral characteristics and the discriminative latent representation, the processing device is configured to:
generate, based on the third learned mapping, the combined features by concatenating the spectral characteristics and the discriminative latent representation.

16. The system of claim 10, wherein to detect the one or more of the plurality of keywords, the processing device is further configured to:
classify, based on the fourth learned mapping, the plurality of keywords into separate classes using the combined features.

17. The system of claim 10, wherein to detect the one or more of the plurality of keywords using the combined features of the spectral characteristics and the discriminative latent representation, the processing device is further configured to:
reduce a false positive rate of detecting a non-target keyword not belonging to the plurality of keywords when compared to using the spectral characteristics alone or using a non-discriminative latent representation to detect the plurality of keywords, wherein the non-discriminative latent representation reduces reconstruction errors compared to the discriminative latent representation; and
reduce a false negative rate of failing to detect the one or more of the plurality of keywords when compared to using the spectral characteristics alone or using the non-discriminative latent representation to detect the plurality of keywords.

18. The system of claim 10, wherein the processing device is further configured to:
determine, based on a fifth learned mapping, the voice command from the audio signal responsive to detecting the one or more of the plurality of keywords; and
initiate interactions with the system based on the voice command.

19. An apparatus, comprising:
one or more microphones configured to receive an audio signal that includes speech data and interference, the speech data containing one or more of a plurality of keywords used to initiate a voice command to the apparatus; and
a machine learning system configured to:
determine spectral characteristics of the audio signal received by the one or more microphones;
determine a discriminative latent representation of the audio signal received by the one or more microphones, the discriminative latent representation grouping similar classes of the speech data to similar regions in an audio input feature space;
combine the spectral characteristics and the discriminative latent representation to generate combined features; and
detect the one or more of the plurality of keywords using the combined features.

20. The apparatus of claim 19, wherein to determine the spectral characteristics of the audio signal, the machine learning system is configured to:
divide the audio signal into a plurality of frames; and
determine Log-Mel spectrograms or Mel Frequency Cepstral Coefficients (MFCC) of the plurality of frames,
and wherein to determine the discriminative latent representation of the audio signal, the machine learning system is further configured to:
determine, by a quadruplet loss variational denoising autoencoder (QVDAE), the discriminative latent representation, wherein the QVDAE is trained to increase distances among different classes of the speech data and to decrease distances among similar classes of the speech data in the audio input feature space using sets of four-tuple training vectors, wherein each set of the four-tuple training vectors includes an anchor example, a positive example, and two negative examples.

* * * * *